US009878754B2

(12) United States Patent
Tsai

(10) Patent No.: US 9,878,754 B2
(45) Date of Patent: Jan. 30, 2018

(54) HEIGHT ADJUSTING DEVICE FOR A BICYCLE SEAT POST

(71) Applicant: Taiwan Hodaka Industrial Co., Ltd., Taipei (TW)

(72) Inventor: Black Tsai, Taipei (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 212 days.

(21) Appl. No.: 15/070,011

(22) Filed: Mar. 15, 2016

(65) Prior Publication Data
US 2017/0240234 A1 Aug. 24, 2017

(30) Foreign Application Priority Data

Feb. 24, 2016 (TW) .............................. 105105558 A

(51) Int. Cl.
*B62J 1/08* (2006.01)
*B62K 19/36* (2006.01)
(52) U.S. Cl.
CPC ................. *B62J 1/08* (2013.01); *B62K 19/36* (2013.01); *B62J 2001/085* (2013.01)
(58) Field of Classification Search
CPC ..... B62K 19/36; B62J 1/06; B62J 1/08; B62J 1/10; B62J 2001/085; A47C 3/30; Y10T 403/32516; Y10T 403/32483
See application file for complete search history.

(56) References Cited

U.S. PATENT DOCUMENTS

| 4,354,398 | A | * | 10/1982 | Porter | .................... | B60N 2/231 403/155 |
| 4,807,856 | A | * | 2/1989 | Teckenbrock | ......... | B62K 19/36 188/67 |
| 5,909,890 | A | * | 6/1999 | Sachs | ................... | B62K 25/286 188/300 |
| 6,220,582 | B1 | * | 4/2001 | Wandschneider | ......... | B62J 1/06 267/64.12 |

(Continued)

FOREIGN PATENT DOCUMENTS

| CN | 2466026 Y | 12/2001 |
| CN | 201350944 Y | 11/2009 |

(Continued)

*Primary Examiner* — Daniel J Wiley
(74) *Attorney, Agent, or Firm* — Alan D. Kamrath; Kamrath IP Lawfirm, P.A.

(57) ABSTRACT

A height adjusting device for a bicycle seat post provides an up-down adjust unit. All the oil-flow control elements of the height adjusting device are arranged inside the up-down adjust unit. The oil flows between the valve port and the oil-block plate are blocked by both the oil-block plate and the valve port touching tightly in an up-down engaging manner. By the structure, what repairing the oil-flow control elements needs is to replace the up-down adjust unit when the oil-flow control elements are out of work. Therefore, it is convenient to repair and assemble. The valve port and the oil-block plate are arranged up and down so that they may touch each other closely in surfaces engaging. Thus, it provides good oil-blocking effects. Besides, the oil-block plate receives no shear stress occurring in the prior art generated from suddenly pressing down the seat. Therefore, it has a long service life.

6 Claims, 8 Drawing Sheets

(56) References Cited

U.S. PATENT DOCUMENTS

| | | | | |
|---|---|---|---|---|
| 7,059,592 B2* | 6/2006 | Huh | ................ | A47C 3/30 |
| | | | | 188/300 |
| 7,231,866 B2* | 6/2007 | Seong | ................ | A47C 3/30 |
| | | | | 297/344.19 |
| 8,167,373 B2* | 5/2012 | Allison | ................ | A47C 3/30 |
| | | | | 297/344.19 |
| 8,177,251 B2* | 5/2012 | Shirai | ................ | B62J 1/08 |
| | | | | 280/288.4 |
| 8,191,964 B2* | 6/2012 | Hsu | ................ | B62K 19/36 |
| | | | | 280/288.4 |
| 8,308,124 B2* | 11/2012 | Hsu | ................ | B62J 1/08 |
| | | | | 248/161 |
| 8,926,216 B2* | 1/2015 | McAndrews | ................ | B62J 1/08 |
| | | | | 403/109.7 |
| 9,010,791 B2 | 4/2015 | Frohlicher et al. | | |
| 2002/0185581 A1* | 12/2002 | Trask | ................ | B62J 1/08 |
| | | | | 248/408 |
| 2013/0269655 A1* | 10/2013 | Yamazaki | ................ | F02D 9/1065 |
| | | | | 123/403 |

FOREIGN PATENT DOCUMENTS

| | | |
|---|---|---|
| TW | I385094 B | 2/2013 |
| TW | M476087 | 4/2014 |
| TW | M481860 U | 7/2014 |
| TW | M509156 U | 9/2015 |
| TW | M513153 U | 12/2015 |
| TW | M522891 U | 6/2016 |

* cited by examiner

HEIGHT ADJUSTING DEVICE FOR A BICYCLE SEAT POST

BACKGROUND OF THE INVENTION

Field of the Invention

The present invention relates to a height adjusting device for a bicycle seat post and, more particularly, to a height adjusting device that not only provides a novel structure but also requires fewer elements and allows to be processed, repaired, and assembled easily.

Description of the Prior Art

Generally, a prior art height adjustment device of a bicycle seat post includes an inner tube, an outer tube, an up-down adjusting unit, and an up-down controlling unit. Wherein, the inner and outer tubes are inserted to each other. The up-down adjusting unit is positioned inside the inner and outer tubes. One end of the up-down adjusting unit is fastened to the outer tube, and the other end of the up-down adjusting unit is secured to the inner tube so as to direct the inner tube to move up or down. The up-down controlling unit, operated by a user, is used to manage the up-down adjusting unit to work or to stop. The prior art height adjustment devices of the bicycle seat post, as disclosed in Taiwan Patent 104205140 and 099137166 (hereafter, the prior art cases), are used to adjust the height of the bicycle seat post. The oil-flow control elements of the up-down adjusting units of the height adjustment devices disclosed in the prior art cases are arranged within both the inner and outer tubes, such that the prior art cases have the following deficiencies:

1. Inconvenient to Assemble and Repair:

The oil-flow control elements of the prior art up-down adjusting unit are configured inside both the inner and outer tubes, so the prior art up-down adjusting unit will use both space of the inner and outer tubes when working. Consequently, all the elements within the seat post need to be disassembled for repairing or replacing if the components are out of work. Hence, what it causes is not only inconvenient repairing but also inconvenient assembling.

2. Frail Oil-Block Ring:

As disclosed in the prior art cases, the outer side of the axle wears a hollow oil-block ring, and the hollow oil-block ring is secured to the axle after being worn on the axle. The oil flows are blocked by both the outer wall of the oil-block ring and the inner wall of the tube touching each other so as to prevent the oil of the first oil chamber separated by the oil-block ring from flowing into the second oil chamber. When the seat is adjusted down, there is a strong press-down force suddenly exerted on the seat post. Accordingly, the oil-block ring bears the shear stress from the sudden press-down movement, so it is easy to break. Furthermore, the oil-block ring may easily get thinner because the outer wall of the oil-block ring rubs the inner wall of the tube under long-time behavior of the shear-stress. Thus, it is easy to be worn to cause oil leakage problems and even out of work.

3. Higher Cost:

The oil flow control elements of the prior art cases are configured within the space of both the inner and outer tubes, such that the firing pin for pushing the oil-flow valve needs to be prolonged in length. Therefore, it may increase costs of pins. Besides, the prior art cases comprise many assemblies, and those assemblies may accumulate high standard deviation so that high precision of the assemblies is also required. In consequence, it may result in a high cost in assemblies processing.

It is against the background and the drawbacks associated therewith that the present invention has been developed.

SUMMARY OF THE INVENTION

The objective of the present invention is to provide a height adjusting device for a bicycle seat post which not only provides a novel structure but also requires fewer elements and allows to be processed, repaired, and assembled easily.

The height adjusting device for a bicycle seat post disclosed in the present invention is characterized by the followings: the height adjusting device is provided with an up-down adjust unit, the oil-flow control elements of the height adjusting device are all arranged in the interior of the up-down adjust unit, and the valve port and the oil-block plate controlling the oil flows touch each other tightly in an up-down engaging manner. By virtue of the aforesaid structure, what repairing the oil-flow control elements needs is to replace the up-down adjust unit with a new one when the oil-flow control elements are out of work. Therefore, it is convenient to repair and assemble. The valve port and the oil-block plate are arranged up and down so as to touch each other closely in surfaces engaging, so that it has good oil-blocking effects. Besides, the oil-block plate does not receive a shear stress, occurring in the prior art, generated from suddenly pressing down the seat. Accordingly, it can provide a long service life.

BRIEF DESCRIPTION OF THE DRAWINGS

In order that the present invention may be more fully understood, a preferred embodiment thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, wherein a preferred embodiment of the present invention is disclosed.

Figure 1:
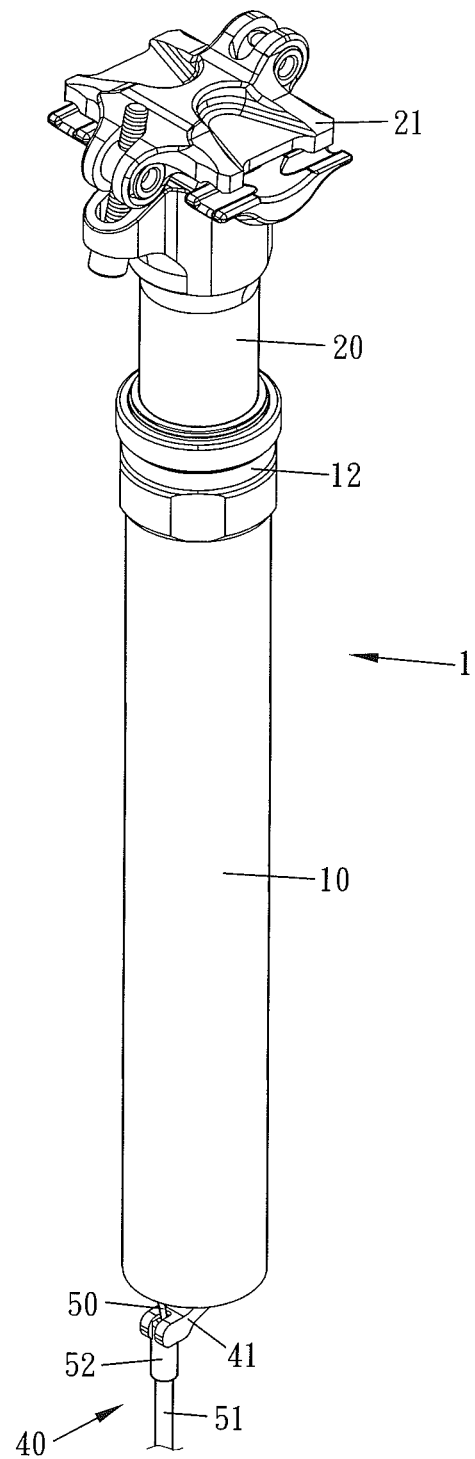
FIG. 1 is a stereogram of a preferred embodiment of the present invention.
Figure 2:
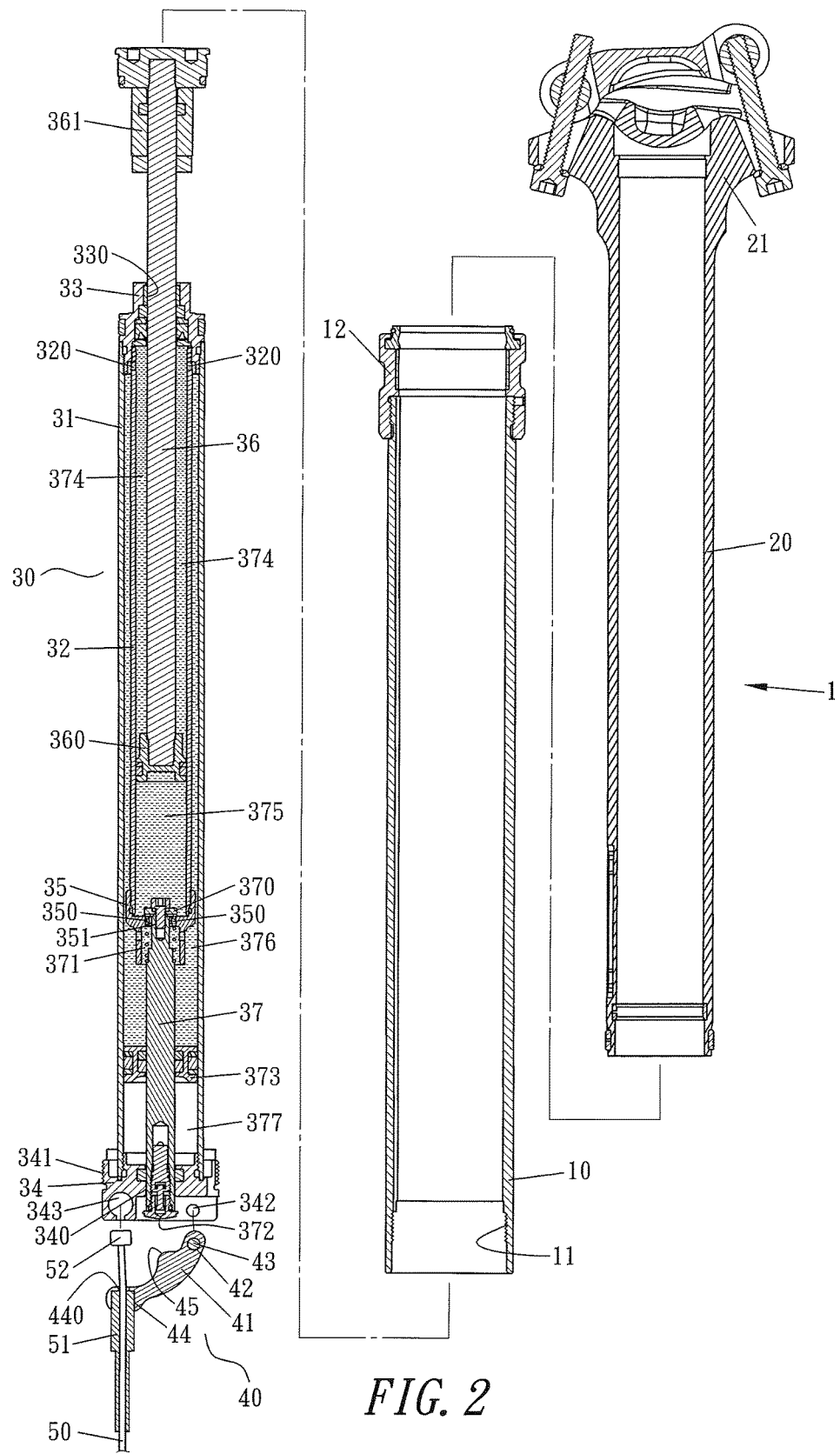
FIG. 2 is a breakdown drawing of the preferred embodiment of the present invention.
Figure 3:
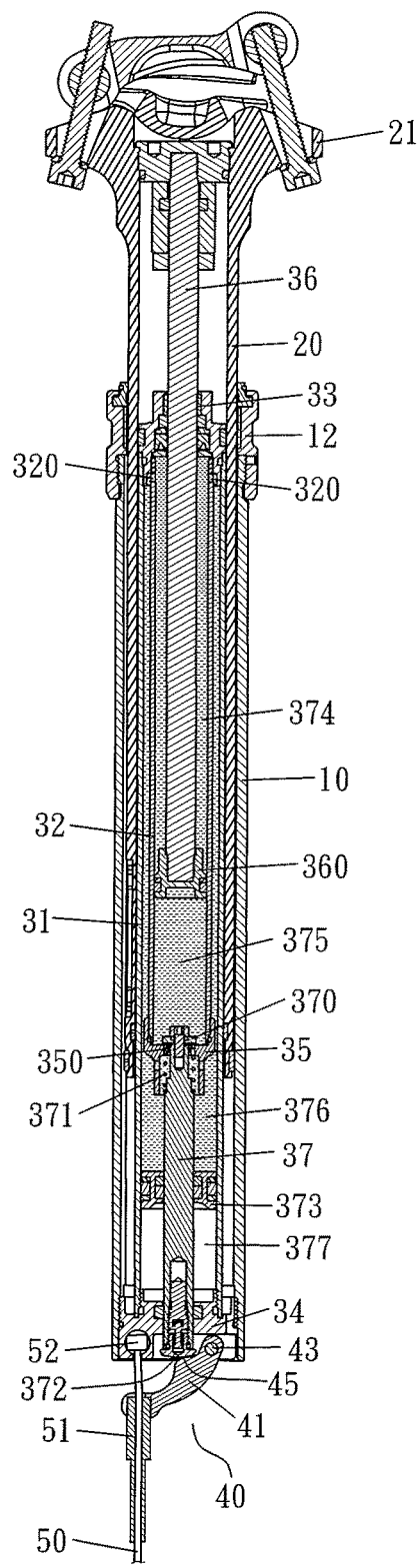
FIG. 3 is a sectional view of the combination of the preferred embodiment of the present invention.

Referring to FIG. 1 to FIG. 3, a height adjusting device 1 for a bicycle seat post disclosed in the present invention includes an outer tube 10, an inner tube 20, an up-down adjust unit 30, and an up-down control unit 40.

The outer tube 10 has a bottom end inserted in a seat tube of a bicycle frame so as to allow the outer tube 10 to be secured to the seat tube. An inner wall of the bottom end of the outer tube 10 is provided with a first threaded surface 11. An outer wall of a top end of the outer tube 10 is disposed with a head end 12.

The inner tube 20 provides a bottom end inserted into an interior of the outer tube 10 from the top end of the outer tube 10, and a top end arranged with a fixing base 21 for securing a bicycle seat.

Figure 4:
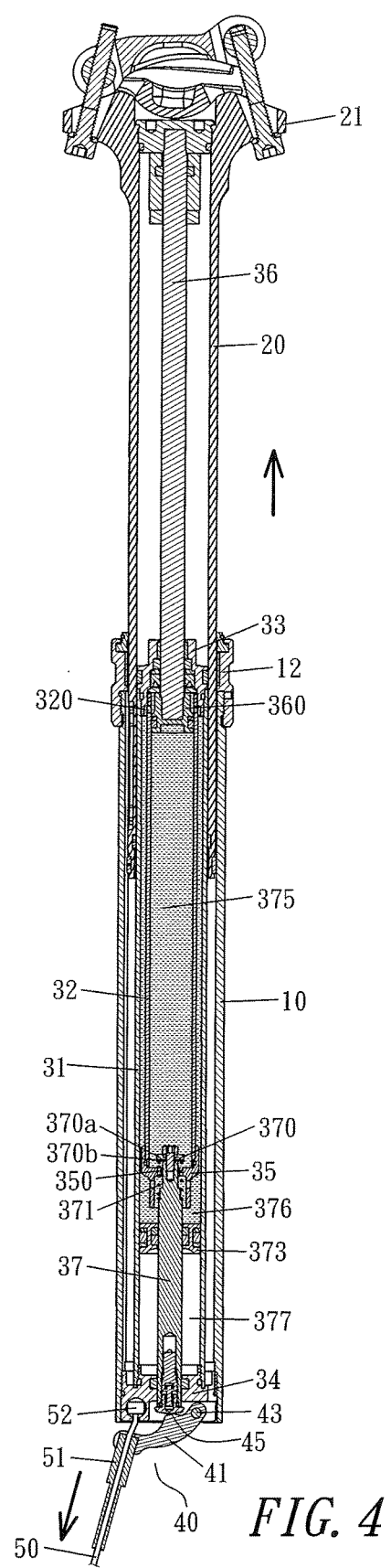
FIG. 4 to FIG. 8 illustrate how the present invention works to adjust and locate the seat post height position.
Figure 6:
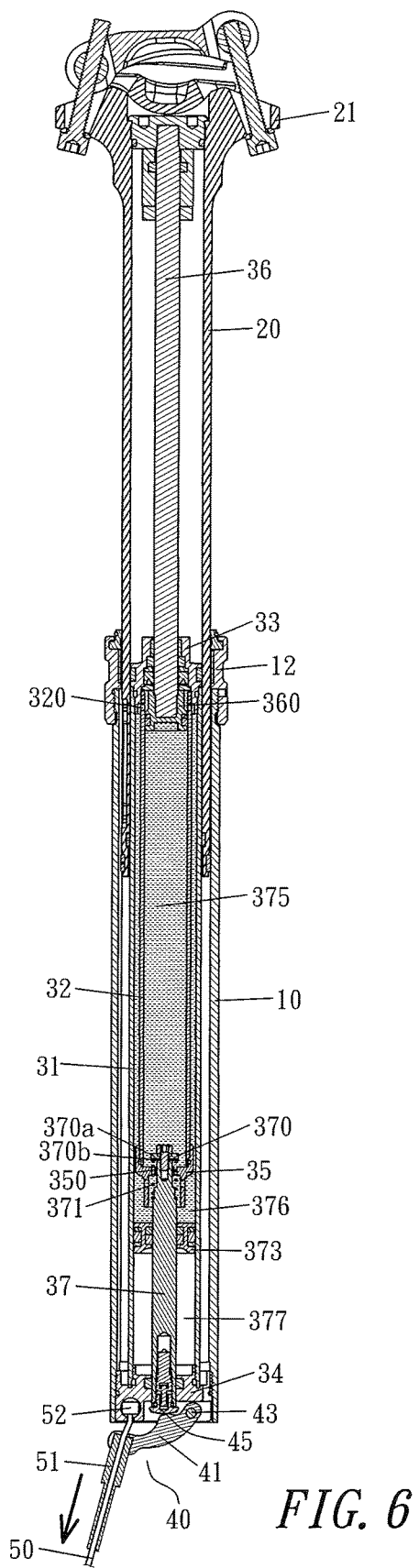

After being combined together, the outer tube 10 and the inner tube 20 form a combination. The up-down adjust unit 30 is arranged inside the combination of the outer tube 10 and the inner tube 20. Moreover, The up-down adjust unit 30 is provided with a first tube 31 and a second tube 32 inserted into the first tube 31, wherein, the second tube 32 is shorter than the first tube 31. An upper joining base 33 is disposed between a top-end opening of the first tube 31 and a top-end opening of the second tube 32 to combine the first tube 31 and the second tube 32. A lower joining base 34 is fixed to a bottom-end opening of the first tube 31. The upper joining base 33 may seal the top-end opening of the first tube 31, and the lower joining base 34 may seal the bottom-end opening of the first tube 31. The lower joining base 34 has an outer wall provided with a second threaded surface 341, and the second threaded surface 341 is allowed to be screwed with the first threaded surface 11 of the outer tube 10 so as to be secured. The upper joining base 33 is arranged with an upper through hole 330 in the center thereof and the lower joining base 34 is also provided with a lower through hole 340 in the center thereof. The second tube 32 has a bottom end disposed with a valve base 35 allowing to seal a bottom-end opening of the second tube 32. The valve base 35 provides an eccentric position arranged with a plurality of axial valve ports 350, and a center provided with a center through hole 351 arranged axially. The up-down adjust unit 30 also includes an axle rod 36 and a firing pin 37. The axle rod 36 has a bottom end configured with a piston 360. The piston 360 is inside the second tube 32. An outer wall of the piston 360 touches an inner wall of the second tube 32. The axle rod 36 has a top end which may stay within the inner tube 20 after passing through the upper through hole 330. Moreover, the top end of the axle rod 36 is disposed with a coupling base 361 fastened with the fixing base 21 so as to allow the axle rod 36 and the inner tube 20 to axially move simultaneously. The firing pin 37 provides an top end whose outer side is arranged with an oil-block plate 370 formed by glue bonding a metal plate 370a and a rubber plate 370b together, as shown in FIG. 4 and FIG. 6, wherein the rubber plate 370b faces the valve port 350. The oil-block plate 370 may stay on top of the valve base 35 after the top end of the firing pin 37 passes through the center through hole 351 of the valve base 35, so that the oil-block plate 370 and the valve port 350 are arranged up and down. The oil-block plate 370 is large enough in diameter to cover and block the plurality of valve ports 350. The firing pin 37 is pushed downwards by an elastic element 371 inside the valve base 35 so as to allow the oil-block plate 370 to block the valve port 350 in a normal state. The firing pin 37 has a bottom end provided with a pushing surface 372 allowing to pass through a lower through hole 340 of the lower joining base 34 to the position under the lower joining base 34. An outer side of a middle section of the firing pin 37 within the first tube 31 is arranged with a floating piston 373 which may axially move along the firing pin 37 after being pushed. The floating piston 373 provides an outer wall touching an inner wall of the first tube 31. A first oil chamber 374 whose interior is filled with oil is arranged inside the second tube 32 and between the piston 360 and the upper joining base 33. A second oil chamber 375 whose interior is filled with oil is also arranged inside the second tube 32 and between the piston 360 and the valve base 35. A third oil chamber 376 whose interior is filled with oil is arranged inside the first tube 31 and in a space formed among the valve base 35, the floating piston 373, and an outer wall of the second tube 32. An air chamber 377 whose interior is filled with air is arranged inside the first tube 31 and between the floating piston 373 and the lower joining base 34. An outer wall of a top end of the second tube 32 is provided with a plurality of oil through holes 320 to allow oil within the third oil chamber 376 to flow into the first oil chamber 374 via the oil through holes 320 when the oil inside the third oil chamber 376 is squeezed.

The up-down control unit 40, being arranged under the pushing surface 372 of the firing pin 37, provides a control arm 41. The control arm 41 has an end disposed with a pivot hole 42 allowing a pivot pin 43 to pass through, and an opposite end, opposite to the position of the pivot hole 42 is configured, arranged with an insertion groove 44. Wherein the pivot pin 43 is pivotally connected with a fasten hole 342 at an eccentric position of the lower joining base 34 so as to pivotally connect the control arm 41 with the lower joining base 34. Moreover, the insertion groove 44, whose center is provided with a wire hole 440, has an opening whose backside faces the pushing surface 372. The outer wall of the lower joining base 34 corresponding to the wire hole 440 is configured with a concave wire-head hole 343. The insertion groove 44 allows an end of a protecting tube 51 to insert into, wherein the protecting tube 51 is arranged outside of a controlling wire 50 and allows the controlling wire 50 to pass through. The wire hole 440 allows a first end of the controlling wire 50 to pass through. A controlling-wire head 52 of the first end of the controlling wire 50 is inserted into the wire-head hole 343 to be secured. The side of the control arm 41 facing the pushing surface 372 is arranged with a protruding push-up member 45 aligning the pushing surface 372. When the controlling wire 50 of the bicycle handlebar is pulled, the control arm 41 is driven to take the pivot pin 43 as the pivot point to eccentrically move towards the firing pin 37 so as to direct the push-up member 45 to push the pushing surface 372 up to actuate the firing pin 37 to simultaneously axially move upwards to cause the oil-block plate 370 to move away from the valve port 350.

According to a preferred embodiment of the present invention, the aforesaid assemblies are allowed to be assembled together to form a combination shown in FIG. 1 and FIG. 3. When employed, the combination of the up-down adjust unit 30 and the up-down control unit 40 can also be arranged inside the outer tube 10 and the inner tube 20 in an inverted manner without being limited by the manner employed in FIG. 1 and FIG. 3.

Figure 5:
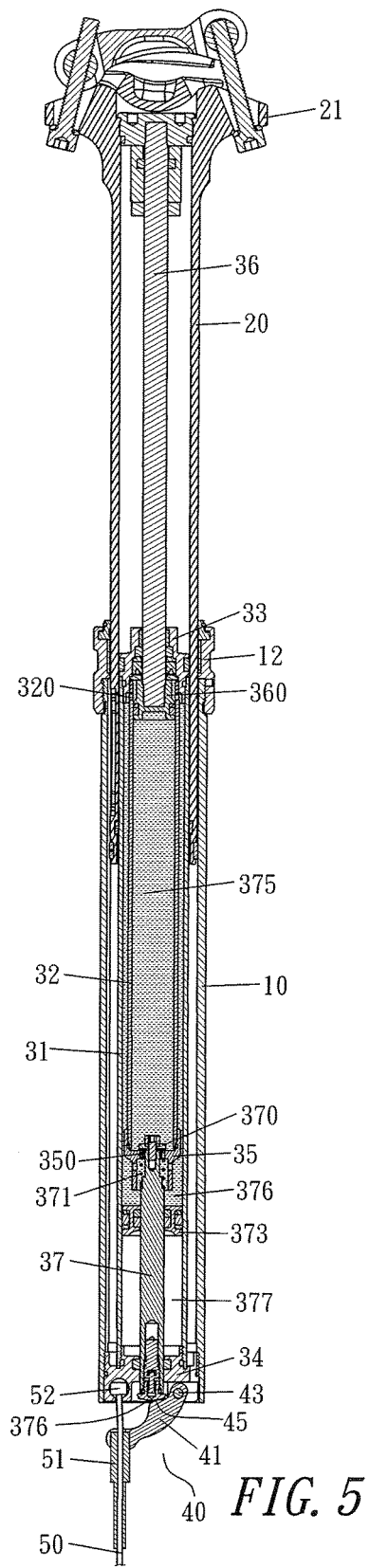

Referring to FIG. 4, if the seat height needs to be adjusted higher, a user has to pull a second end of the controlling wire 50 at the bicycle handlebar (the second end is opposite to the first end of the controlling wire 50). Accordingly, the protecting tube 51 at the first end of the controlling wire 50 is pushed to direct the end of the protecting tube 51 to drive the control arm 41 to take the pivot pin 43 as the pivot point to turn pivotally to actuate the push-up member 45 to push the pushing surface 372 and the firing pin 37 up to press the elastic element 371 so as to allow the firing pin 37 to axially move upwards to cause the oil-block plate 370 to move away from the valve port 350 to enable the second oil chamber 375 and the third oil chamber 376 to communicate with each other. At this moment, don't press the seat. The floating piston 373 is pushed by the air pressure within the air chamber 377 to axially move upwards to squeeze the oil inside the third oil chamber 376 to reversely flow through the valve port 350 into the second oil chamber 375 to push the piston 360, the axle rod 36 and the inner tube 20 up. Besides, the oil of the first oil chamber 374 is squeezed upwards by the piston 360 to flow into the third oil chamber 376 via the oil through hole 320. Thus, the seat can be adjusted higher. Referring to FIG. 5, when the seat raises to a desired height, the user needs to release the controlling wire 50. Then, the end of the protecting tube 51 stops pushing the push-up member 45 of the control arm 41 so that the push-up member 45 stops pushing the firing pin 37. Consequently, the firing pin 37 is pushed back to its home position by the elastic element 371 to cause the oil-block plate 370 to block the valve port 350 to stop the oil flowing so as to locate the seat height position.

Figure 7:
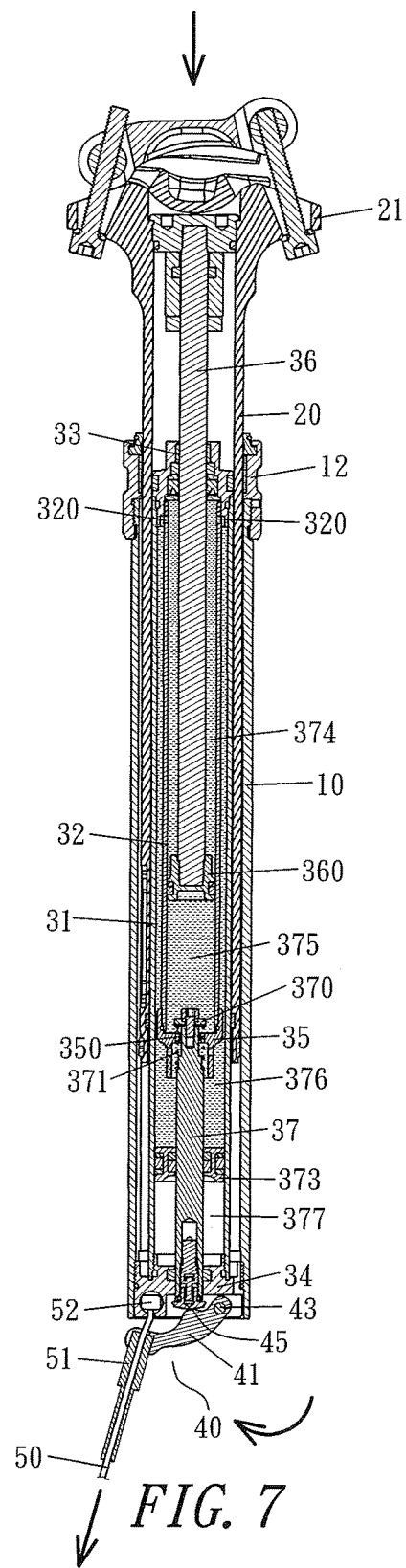
Figure 8:
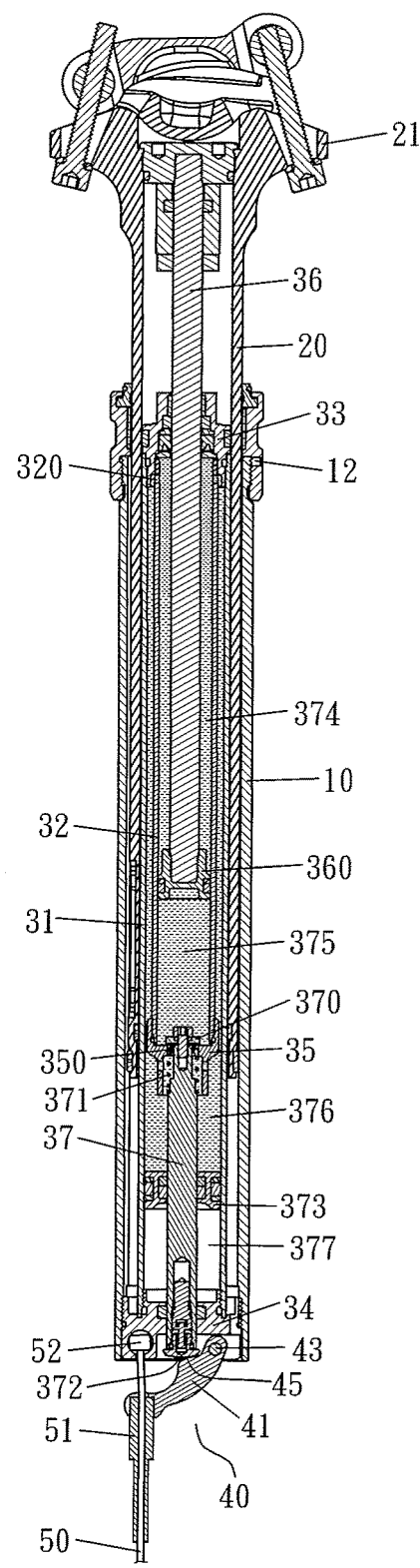

If the seat height needs to be adjusted lower, the second end of the controlling wire 50 of the bicycle handlebar needs to be pulled. Thus, the protecting tube 51 of the first end of the controlling wire 50 is driven to actuate the control arm 41 to take the pivot pin 43 as the pivot point to turn pivotally to direct the push-up member 45 to push the pushing surface 372 and the firing pin 37 up to axially move upwards to cause the oil-block plate 370 to move away from the valve port 350 to enable the second oil chamber 375 and the third oil chamber 376 to communicate with each other, as shown in FIG. 6. At this moment, the user needs to exert a force on the seat to press down the axle rod 36 and the inner tube 20, as shown in FIG. 7. The oil within the second oil chamber 375 is squeezed by the piston 360 to flow through the valve port 350 into the third oil chamber 376. With the down-press movement of the axle rod 36 and the piston 360, part of oil inside the second oil chamber 375 may flow into the first oil chamber 374 via the oil through holes 320. Because the axle rod 36 inserts into the second tube 32, it occupies some inner space of the first oil chamber 374 and causes the first oil chamber 374 and the second oil chamber 375 do not have enough space to accommodate the oil completely. Thus, the oil flowing into the third oil chamber 376 accumulates pressure to push the floating piston 373 to move downwards to squeeze the air within the air chamber 377. When the air pressure accumulated in the air chamber 377 is equal to the oil pressure of the third oil chamber 376, the axle rod 36 and the inner tube 20 are not allowed to move down any more. That is the lowest position the seat can reach. After the seat is lowered to a desired height, the controlling wire 50 needs to be released. Then, the firing pin 37 and the oil-block plate 370 are immediately pushed back to their home positions by the restoring force of the elastic element 371 to drive the oil-block plate 370 to block the valve port 350. Thus, the oil in the second oil chamber 375 and in the third oil chamber 376 may stop flowing so as to fix the seat height position after adjusted, as shown in FIG. 8.

The aforesaid oil flows are all arranged and managed inside the up-down adjust unit 30, that is, the up-down adjust unit 30 can be regarded as a closed type, so that the whole up-down adjust unit 30 is allowed to be replaced with a new one adjust unit 30 when the oil-flow control elements break down or need assembling together. Therefore, it is convenient to repair and assemble.

As the mentioned, the oil-block plate 370 and the valve port 350 are arranged up and down such that they may touch each other tightly in an up-down engaging manner to block the oil flows between the oil-block plate 370 of the up-down adjust unit 30 and the valve port 350. Accordingly, the oil-block plate 370 will not receive the shear stress generated from suddenly pressing down the seat when the seat height is adjusted, so as to have a long service life.

The aforesaid structure is novel and requires fewer elements, so that it may reduce not only working hours but also cost in processing and assembling.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

What is claimed is:

1. A height adjusting device for a bicycle seat post, comprising an outer tube, an inner tube, an up-down adjust unit, and an up-down control unit; wherein a bottom end of the inner tube is inserted into an interior of the outer tube from a top end of the outer tube; the up-down adjust unit is arranged inside a combination of the outer tube and the inner tube; the up-down control unit is used to control the up-down adjust unit to work or to stop; the height adjusting device being characterized in that:

the up-down adjust unit is provided with a first tube and a second tube inserted into the first tube, wherein a top-end opening of the first tube and a top-end opening of the second tube are joined with an upper joining base between the top-end openings of the first and second tubes so as to combine the first and second tubes, wherein a bottom-end opening of the first tube is disposed with a lower joining base whose outer wall is fastened with an inner wall of a bottom end of the outer tube, wherein the upper joining base allows to seal the top-end opening of the first tube and the lower joining base allows to seal the bottom-end opening of the first tube; wherein the upper joining base is arranged with an upper through hole in a center and the lower joining base is provided with a lower through hole in a center; wherein a bottom end of the second tube is configured with a valve base allowing to seal a bottom-end opening of the second tube, wherein the valve base has an eccentric position arranged with a plurality of axial valve ports and a center provided with a center through hole arranged axially; the up-down adjust unit also includes an axle rod and a firing pin, wherein a bottom end of the axle rod is arranged with a piston whose outer wall touches an inner wall of the second tube, wherein the piston is inside the second tube; a top end of the axle rod is allowed to stay within the inner tube after passing through the upper through hole, and the top end of the axle rod is disposed with a coupling base fastened with the inner tube so as to allow the axle rod and the inner tube to axially move simultaneously; wherein the firing pin has an top end whose outer side is arranged with an oil-block plate, which is allowed to stay on top of the valve base after the top end of the firing pin passes through the center through hole of the valve base, wherein the oil-block plate and the valve port are arranged up and down, wherein the oil-block plate is large enough in diameter to cover and block the plurality of valve ports; wherein the firing pin is pushed downwards by an elastic element inside the valve base so as to allow the oil-block plate to block the valve port; wherein a bottom end of the firing pin passes through the lower through hole to stay under the lower joining base, and the bottom end of the firing pin is provided with a pushing surface; wherein an outer side of a middle section of the firing pin within the first tube is arranged with a floating piston allowing to axially move along the firing pin after being pushed, wherein an outer wall of the floating piston touches an inner wall of the first tube; wherein the second tube is provided with a first oil chamber whose interior is filled with oil and a second oil chamber whose interior is filled with oil, wherein the first oil chamber is arranged between the piston and the upper joining base, and the second oil chamber is arranged between the piston and the valve base; wherein the first tube is configured with a third oil chamber whose interior is filled with oil and an air chamber whose interior is filled with air, wherein the third oil chamber is arranged in a space formed among the valve base, the floating piston, and an outer wall of the second tube, and the air chamber is arranged between the floating piston and the lower joining base; and wherein an outer wall of a top end of the second tube is provided with a plurality of oil through holes to allow oil within the third oil chamber to flow into the first oil chamber via the oil through holes when the oil inside the third oil chamber is squeezed.

2. The height adjusting device as claimed in claim 1, wherein the up-down control unit is arranged under the pushing surface and provided with a control arm, wherein an end of the control arm is disposed with a pivot hole allowing a pivot pin to pass through, wherein the pivot pin is pivotally connected with a fasten hole at an eccentric position of the lower joining base; wherein an opposite end of the control arm, opposite to the pivot hole end, is configured with an insertion groove having an opening whose backside faces the pushing surface, wherein a center of the insertion groove is provided with a wire hole, wherein the outer wall of the lower joining base corresponding to the wire hole is disposed with a concave wire-head hole; wherein the insertion groove allows an end of a protecting tube to insert into, wherein the protecting tube is arranged outside of a controlling wire and allows the controlling wire to pass through; wherein the wire hole allows a first end of the controlling wire to pass through, wherein a controlling-wire head of the first end of the controlling wire is inserted into the wire-head hole to be secured; wherein a side of the control arm facing the pushing surface is arranged with a protruding push-up member aligning the pushing surface; when the controlling wire is pulled, the control arm is driven to take the pivot pin as the pivot point to eccentrically move towards the firing pin so as to direct the push-up member to push the pushing surface up to actuate the firing pin to simultaneously axially move upwards to cause the oil-block plate to move away from the valve port.

3. The height adjusting device as claimed in claim 1, wherein the oil-block plate is formed by glue bonding a metal plate and a rubber plate together, and wherein the rubber plate faces the valve port.

4. The height adjusting device as claimed in claim 2, wherein the oil-block plate is formed by glue bonding a metal plate and a rubber plate together, and wherein the rubber plate faces the valve port.

5. The height adjusting device as claimed in claim 4, wherein a top end of the inner tube is provided with a fixing base for securing a bicycle seat.

6. The height adjusting device as claimed in claim 5, wherein an inner wall of the bottom end of the outer tube is provided with a first threaded surface, wherein the outer wall of the lower joining base is arranged with a second threaded surface, and wherein the outer wall of the lower joining base is fastened to the inner wall of the bottom end of the outer tube by screwing the first and second threaded surfaces together.

* * * * *